July 29, 1930. H. GROB 1,771,537
SYSTEM AND APPARATUS FOR ELECTRICAL REGULATION
Filed April 27, 1927
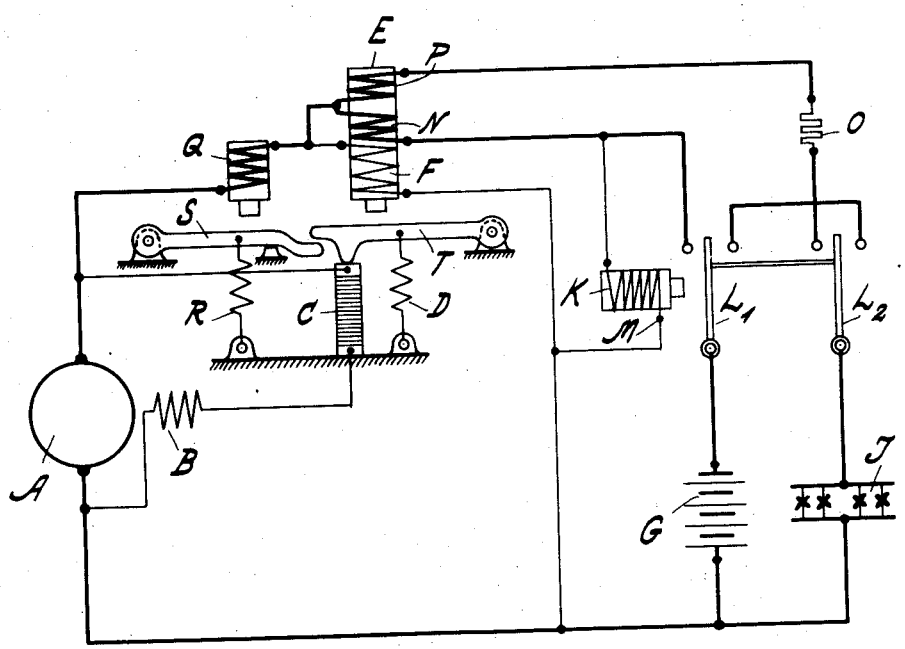
Inventor:
Hugo Grob
Robert L. Blair
Attorney Patented July 29, 1930

1,771,537

UNITED STATES PATENT OFFICE

HUGO GROB, OF BERLIN, GERMANY

SYSTEM AND APPARATUS FOR ELECTRICAL REGULATION

Application filed April 27, 1927, Serial No. 187,101, and in Germany July 22, 1926.

This specification relates to systems of electrical distribution and more particularly to means for protecting the generator and the storage battery of generating plants from excessive currents.

In generating and lighting equipment, such, for example, as employed in railway car lighting, in order to recharge the storage battery within a relatively short time, it is desirable that a relatively high charging voltage be employed. The storage battery, however, may not be subjected to a high charging voltage until it has attained a certain state of charge, since otherwise the storage battery is apt to be damaged by a too high charging current. It is particularly desirable that this high battery charging current be avoided in the case of equipments in which the generator is of a limited size, such as in the case of train lighting or car lighting apparatus. Since in such apparatus the charging of the battery is taken care of automatically, the generator is required to be protected from over-loading. In car lighting systems it thus becomes important to guard against charging the battery with too high charging current when the battery charge is low, and also to prevent over-loading and consequent injury to the generator.

It has been attempted to achieve this desired protection by furnishing the generator with a regulator for regulating the current output of the generator, as distinguished from a voltage regulator. This form of regulator, although possibly safeguarding the generator from over-loading, maintains a predetermined high output of total generator current under all conditions and has the disadvantage that, prior to the attainment of a high counter voltage in the battery, the battery is at times charged with too great a charging current. It is to be remembered that a storage battery, by gas formation, and the washing away of the active plate material, is damaged all the more the stronger are the currents with which the battery continues to be charged at the higher voltages.

Also, it has been attempted to secure the desired protection by regulating the battery charging current alone, as distinguished from regulating the total current flowing from the generator. Such regulators cause the voltage at the battery terminals to drop as the charging current increases. However, when such regulation is depended upon, the current supplied by the generator to the lamp circuit is not affected and depends simply on the number of lamps which are switched on.

In spite of the harmful effects upon the battery resulting from the regulation first above-mentioned, it has been necessary to employ this regulation in all cases wherein the generating apparatus of different cars or coaches have been connected in parallel. In severe weather conditions in winter it may readily occur that the generator drive fails in the equipment of several cars. If the lamp circuits of all of the cars are connected together when several of the generators thus fail, an over-loading of the remaining generators would occur unless the current supplied by these generators to their lighting circuits were regulated and limited. Thus, in cases where the cars are connected in parallel, the second method of regulation which has been mentioned above cannot safely be employed and it has been necessary to employ the first with its harmful effects upon the battery.

It is an object of the present invention to provide a regulating apparatus which overcomes the disadvantages discussed above and protects the storage battery from too high a charging current and also prevents an over-loading of the generator. In accordance with certain features of the invention, the battery charging current is regulated so that, particularly during traveling in the daytime, the storage battery is not charged with a too high current, and at the same time the total generator current is regulated so that, even though the lighting systems of the individual cars are connected in parallel, the generators are fully protected against over-loading. Other objects and advantages of the invention will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the single figure of the accompanying drawing there is shown diagrammatically one of the various possible embodiments of the invention.

Referring now to the drawing in detail, there is shown at A the generator of the generating and lighting equipment of a railway car. The field winding of the generator is shown at B and, connected in series therewith, is a variable resistance device taking the form of a carbon pile C. A spring D acts upon a lever T tending to increase the compression of the carbon pile so as to lower its resistance, and an electromagnet E acts upon the lever T in opposition to the spring. The electromagnet E is provided with a voltage coil F which is connected across the terminals of the generator and hence, responsive to generator voltage, tends to decrease the compression of the carbon pile C and to increase its resistance as the generator voltage increases. When the generator voltage tends to increase, the coil F thus cuts down the field current of the generator and causes the generator voltage to drop. Conversely, when the generator voltage tends to drop, the coil F effects an increase in the energization of the generator field tending to again raise the generator voltage. The coil F thus acts to maintain a substantially constant voltage at the generator terminals.

The storage battery G is adapted to be charged by the generator A and the lamps J are adapted to be supplied with current thereby. The generator is adapted to be connected with the storage battery and the lamps by way of a switch $L_1$—$L_2$. When the train is stationary and the generator A is hence idle, this switch assumes a position with its two arms $L_1$ and $L_2$ inclined to the right as viewed in the drawings, thereby connecting the lamps J to be fed by the storage battery B and disconnecting the generator. The switch $L_1$—$L_2$ is provided with an electromagnet K which is energized by a voltage coil M. As soon as the generator voltage builds up to a predetermined safe value, the switch $L_1$—$L_2$ is attracted by the magnet K and moves to a position in which the levers $L_1$ and $L_2$ are inclined to the left. In this position of the switch the battery and lamps are connected to be supplied by the generator. The switch connects the battery to the generator through a series coil N upon the electromagnet E, and connects the lamps J with the generator through a series coil P upon the electromagnet E and through a resistance O. The resistance O is not shown in detail herein, but it is preferably a variable resistance device incorporated with a regulating mechanism which is adapted to maintain the voltage impressed upon the lamps J at a substantially constant value.

By the action of the voltage coil F, the generator voltage is maintained at a substantially constant value throughout varying speeds of the generator and with varying loads, this voltage being such that it is suitable for charging the battery. When the generator voltage is at this correct predetermined value, the regulating apparatus is preferably in a substantially perfect state of equilibrium, the pull of the magnet E substantially counter-balancing the pull of the spring and the reactive force of the carbon pile throughout the range of movement of the lever or armature T.

When the generator is operating normally and the switch $L_1$—$L_2$ is therefore moved to the left, as has been described, the coil N is energized by the battery charging current. The action of the coil N is to assist the voltage coil F, and hence, the number of ampere turns required to be created by the voltage coil F, in order to maintain the armature T in equilibrium, is reduced by the number of ampere turns created by the battery charging current flowing through the coil N. The result is that the generator voltage drops, and together therewith the terminal voltage at the battery drops substantially in proportion to the amount of battery charging current, the charging voltage decreasing as the charging current tends to increase. Thus, the magnitude of the battery charging current is effectively limited.

Adjacent to the electromagnet E is a second electromagnet Q which is provided with a coil carrying the total current output from the generator. The magnet Q, thus excited by and responsive to the total generator current, tends to attract a lever or armature S, and acting upon the armature S in opposition to the magnet Q is a spring R. The coil of the magnet Q is adapted to limit the total current output of the generator to a predetermined maximum value. The coil of the electromagnet Q and the spring R are so proportioned that, when the coil is excited by a current which is substantially equal to this predetermined maximum, the lever or armature S is in a state of substantial equilibrium throughout its complete range of movement.

The armature S is loosely coupled with the armature T of the voltage regulator in such manner that the latter armature is capable of operating without interference by the armature S as long as the total current flowing from the generator is below the predetermined maximum value, or as long as the armature S is in its retracted position shown in the drawing. If the current output of the generator tends to exceed this maximum predetermined value, the lever S is moved to engage the lever T and thus takes over the control of the carbon pile C, relieving the pressure upon the carbon pile and thereby cutting down the generator output. The generator is thus dependably protected under all conditions against over-loading.

From the foregoing it will be seen that the generator is fully protected against over-loading and also the battery is protected against being charged with too high a charging current. Without the provision of the battery current regulating device herein provided by the action of the coil N, assuming that the train is traveling at a sufficiently high speed, the generator then continually generates a strength of current equal to its maximum output permitted by the electromagnet Q, until the counter voltage of the battery had built up to a high value, and accordingly, during the daytime when the lamps are not being used, the battery would be charged with a current much too high for the relatively high counter voltages of the battery.

During traveling in the daytime, when a rapid charging of the battery is not necessary, in order to prevent undue wear and tear upon the battery, it should be charged somewhat less intensively than during night traveling when the lights are being used and a rapid charging of the battery is therefore desired. Such provision is particularly desirable during the summer months so as to safeguard the battery cells against overcharging.

Referring again to the drawing, as has been mentioned above, when the lamps J are switched on to be supplied with current from the generator, the current taken by the lamps is passed through a series coil P provided upon the electromagnet E. The coil P acts in opposition to the voltage coil F and it thus tends to increase the generator voltage when the lamps are switched on. Preferably the coil F and the coil P are so proportioned that, under the voltage increasing action of the coil P, the desired charging voltage results during night traveling when the lamps are being used; accordingly, during the daytime when the lamp circuit is open, the charging voltage is less and accomplishes the desired protection of the battery.

The winding of the electromagnet Q, instead of conducting the total generator current, might be connected to conduct the lighting current alone, the generator being thereby afforded the desired protection against over-loading by the switching on of an excessive number of lamps in its own car or in other cars whose lamp circuits may be connected thereto. With such an arrangement both the battery charging current and the lighting current, each by itself, and accordingly the total generator current, are limited.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

What I claim as new and desire to secure by Letters Patent is:

1. In a system of electrical distribution, in combination, a generator; a storage battery adapted to be charged thereby; a lamp circuit; and means for regulating the output of said generator, said means including a carbon pile, a movable member engaging one end of said pile, spring means acting upon said movable member in a direction to cause the latter to compress said pile, a second movable member adapted upon movement to engage said first-mentioned movable member, spring means opposing movement of said second movable member, means responsive to generator voltage for controlling said first-mentioned movable member, means responsive to battery charging current for assisting said voltage responsive means, means responsive to lamp current for opposing said voltage responsive means, and means responsive to total generator current for controlling the actuation of said second-mentioned movable member.

2. In a system of electrical distribution, in combination, a generator; a storage battery adapted to be charged thereby; a lamp circuit; and means for regulating the output of said generator, said means including a carbon pile, a movable member engaging one end of said pile, spring means acting upon said movable member in a direction to cause the latter to compress said pile, a second movable member adapted upon movement to engage said first-mentioned movable member, spring means opposing movement of said second movable member, a coil responsive to battery charging current for actuating said first-mentioned movable member in a direction to relieve the pressure on said pile, a coil responsive to lamp current for opposing said battery current coil, and means responsive to total generator current for controlling the actuation of said second-mentioned movable member.

3. In a system of electrical distribution, in combination, a generator; a storage battery adapted to be charged thereby; a lamp circuit adapted to be supplied by either said battery or said generator; and means for regulating the output of said generator, said means including means for regulating said generator for substantially constant battery charging current, means responsive substantially to the turning on of lamps for increasing the current output of said generator, said means acting upon a variable resistance in the field circuit of said generator, and means acting upon said variable resistance and electromagnetically independently of said above-mentioned regulating means for preventing the current output of said generator from exceeding a predetermined limit.

4. In a system of electrical distribution, in combination, a generator; a storage battery adapted to be charged thereby; a lamp circuit; and means for regulating the output of said generator, said means including a variable resistance, a movable member adapted upon movement to vary said resistance, means responsive to battery charging current for actuating said movable member, means responsive to lamp current for opposing said battery-current-responsive means, a second movable member adapted upon movement to engage said first-mentioned movable member, and means responsive to total generator current for controlling the actuation of said second-mentioned movable member.

In testimony whereof I have affixed my signature.

HUGO GROB.